(12) United States Patent
Barmish et al.

(10) Patent No.: US 9,898,751 B1
(45) Date of Patent: Feb. 20, 2018

(54) DIRECT PURCHASE OF MERCHANDISE

(71) Applicant: Amazon Technologies, Inc., Reno, NV (US)

(72) Inventors: Kevin Mitchell Barmish, Seattle, WA (US); Ozgur Dogan, Seattle, WA (US); Karthik Gopal Anbalagan, Redmond, WA (US); Jason Christopher Kirk, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1033 days.

(21) Appl. No.: 13/801,151

(22) Filed: Mar. 13, 2013

(51) Int. Cl.
  *G06Q 30/02* (2012.01)

(52) U.S. Cl.
  CPC ................. *G06Q 30/0222* (2013.01)

(58) Field of Classification Search
  CPC .................................................. G06Q 30/00
  See application file for complete search history.

(56) References Cited

U.S. PATENT DOCUMENTS

| | | | | |
|---|---|---|---|---|
| 6,167,441 A | * | 12/2000 | Himmel | G06F 17/30905 707/999.104 |
| 2003/0069858 A1 | * | 4/2003 | Kittlitz | G06Q 20/02 705/76 |
| 2004/0098313 A1 | * | 5/2004 | Agrawal | G06Q 20/00 705/51 |
| 2006/0129502 A1 | * | 6/2006 | Pastusiak | G06F 21/10 705/71 |
| 2007/0073630 A1 | * | 3/2007 | Greene | G06Q 20/40 705/80 |
| 2008/0004974 A1 | * | 1/2008 | Bawcutt | G06F 21/10 705/26.8 |
| 2008/0139306 A1 | * | 6/2008 | Lutnick | G06Q 30/02 463/30 |
| 2009/0144153 A1 | * | 6/2009 | Kondrk | G06Q 30/0277 705/14.73 |
| 2010/0161383 A1 | * | 6/2010 | Butler | G06Q 10/04 705/28 |
| 2011/0320320 A1 | * | 12/2011 | Dearlove | G06Q 30/0641 705/27.1 |
| 2012/0079606 A1 | * | 3/2012 | Evans | G06F 21/10 726/28 |
| 2012/0124676 A1 | * | 5/2012 | Griffin | G06Q 20/12 726/28 |
| 2012/0310753 A1 | * | 12/2012 | Gaddis | G06Q 30/0241 705/14.73 |
| 2013/0173377 A1 | * | 7/2013 | Keller | G06Q 50/01 705/14.35 |
| 2014/0040445 A1 | * | 2/2014 | Beckert | H04L 67/2823 709/223 |

* cited by examiner

*Primary Examiner* — Kathleen Palavecino
*Assistant Examiner* — Abby Flynn
(74) *Attorney, Agent, or Firm* — Eversheds Sutherland (US) LLP

(57) ABSTRACT

This disclosure describes systems and methods related to providing direct purchase of merchandise from an electronic communication and subsequent delivery of the purchased merchandise. A direct merchandise purchase system may generate an electronic communication associated with an offer for merchandise for a user. The user may be able to directly purchase merchandise from the electronic communication which may then be delivered accordingly.

23 Claims, 8 Drawing Sheets

GENERATE AND TRANSMIT
ELECTRONIC COMMUNICATION
OFFERING MERCHANDISE
602

RECEIVE REQUEST FOR
OFFERED MERCHANDISE
604

VERIFY USER IDENTITY
606

PROCESS TRANSACTION AND
TRANSMIT CONFIRMATION
608

TRANSMIT INSTRUCTIONS TO
DELIVER MERCHANDISE
610

DELIVER
MERCHANDISE
612

DIRECT PURCHASE OF MERCHANDISE

BACKGROUND

People may purchase products and services through a variety of different methods. A variety of user devices, such as desktop computers, portable computers, smartphones, tablet computers, and so forth may provide Internet browsers which may be used to purchase products and services. However, these user experiences for purchasing products and services through the user devices may be cumbersome and time-consuming.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe a component or element may encompass a plural number of such components or elements and vice versa.

DETAILED DESCRIPTION

Figure 1:
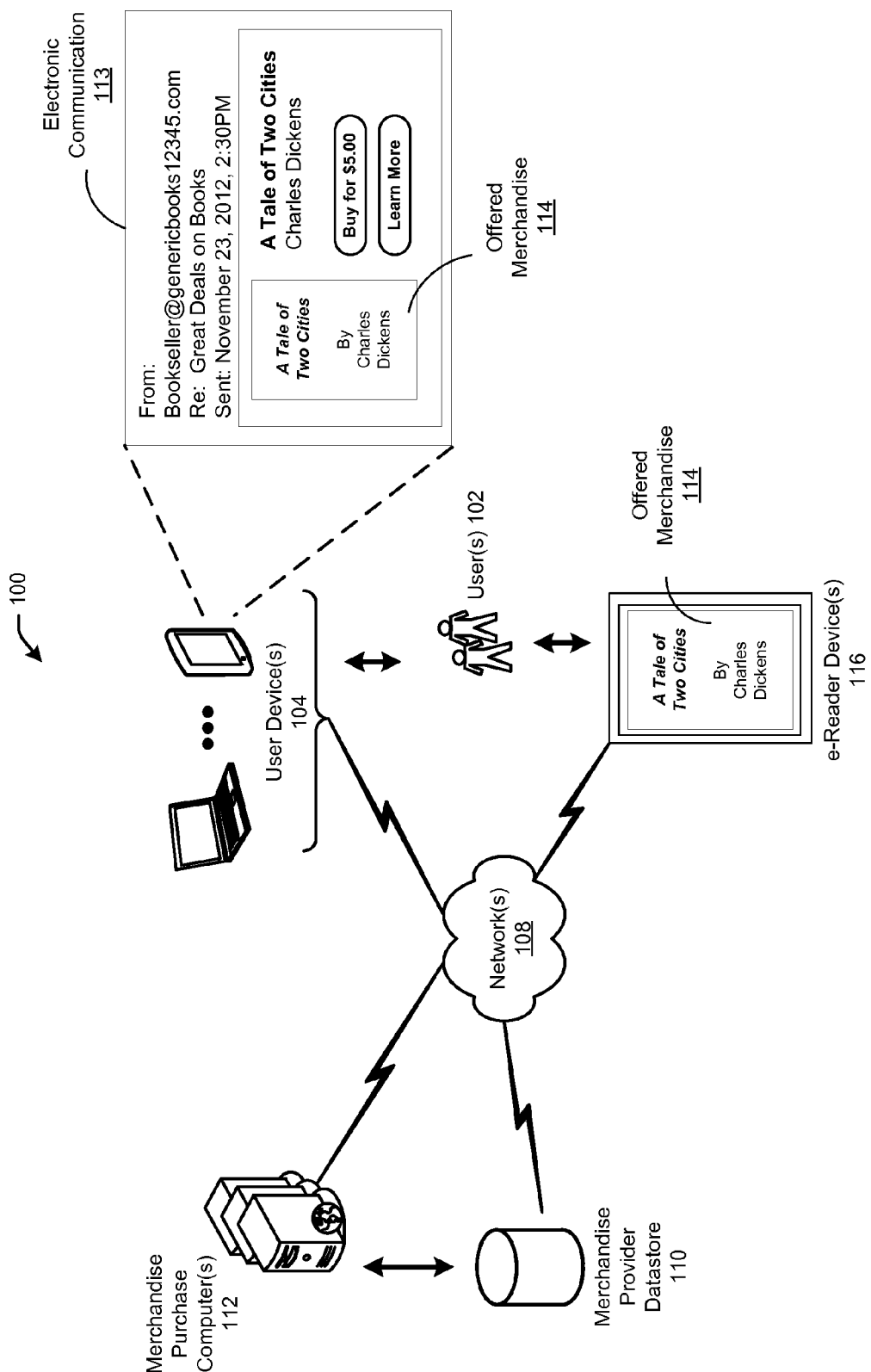
FIG. 1 illustrates a system for direct purchase of merchandise in accordance with an embodiment of the disclosure.

Users may receive multiple merchandising emails for merchandise, such as consumer products, electronic books (e-books), music, movies, services (e.g., spa treatments, activities, car cleaning, etc.) and so forth. For example, a user may receive an offer email for a particular e-book. In many cases, the user may need to select a uniform resource identifier, such as a URL or a button associated with a URL in the email which may direct the user to a webpage with more details about the offered e-book. This may be a cumbersome process that requires multiple steps after the selection of the button in the email offer before a purchase for the e-book may be effectuated.

This disclosure describes systems and methods related to providing direct purchase of merchandise from a received electronic communication and subsequent delivery of the purchased merchandise (e.g., to one or more specified e-reader devices, a shipping address, etc.). For example, a user may receive an electronic communication, such as an email, from a merchant offering an item or service for sale and with a single selection of a button or hyperlink in the email, the user may be able to complete the purchase of the offered item or service without any further user intervention or activity. A direct merchandise purchase system may generate an email associated with an offer for merchandise for a user. The generated email may include a token that may be used to verify the identity of the intended offer recipient and the user purchasing the offered merchandise. Once the user identity has been verified, the direct merchandise purchase system may process the transaction for the purchase of the merchandise. For example, the direct merchandise purchase system may process the transaction for a user, Anne, to buy a novel using payment information associated with Anne, such as a stored credit card number and billing address.

After the transaction has been processed, the direct merchandise purchase system may facilitate the delivery of the purchased merchandise. For example, in some embodiments, where the merchandise is digital content, the direct merchandise purchase system may retrieve device information associated with the user and deliver the merchandise to a pre-determined default device, such as an e-reader device or a smartphone. In some embodiments, the direct merchandise purchase system may request further information from the user upon completion of the transaction and may request specific information for merchandise delivery. For example, the direct merchandise purchase system may identify multiple devices associated with a user. The system may request the user to specify a device to receive the purchased merchandise. In some embodiments, where the merchandise is a physical good, the system may request the user to specify a shipping address and/or a shipping method for the purchased merchandise.

In one embodiment of the methods and systems described herein, the direct merchandise purchase system may generate an email to Anne for e-books by John Smith. Anne may forward the email to her friend Betty who is a huge fan of John Smith. When Betty clicks on the option in the email to purchase the book by John Smith, the direct merchandise purchase system may determine whether the intended recipient of the offer (e.g., Anne) is not the same person purchasing the merchandise (e.g., Betty). This may be important because different marketing campaigns may be targeting different customers and users. For example, Anne may have received the email as a result of a recent purchase of a specific e-reader device. Betty may not have received the email because she owns a different type of e-reader device. Therefore, if Betty attempts to purchase the merchandise through the offer sent to Anne, there may be a problem resulting from the different formats required for the different types of e-reader devices. Additionally, verification may be required to ensure security. For example, if Anne forwarded an email she received for the book by John Smith, by verifying the identity of the user, the direct merchandise purchase system ensures that Betty cannot purchase the book using Anne's account information.

Illustrative System

FIG. 1 illustrates a system 100 for directly purchasing merchandise from an electronic communication, such as email or an online advertisement (e.g., in-text or contextual advertisements). For illustrative purposes, this disclosure generally describes the methods and systems in the context of merchandise, such as electronic content (e.g., electronic books, movies, music). However, the offered merchandise as described herein may include consumer goods, services, and so forth. The systems and methods described herein may be generally applicable to physical goods and services.

In brief overview, the merchandise purchase computer(s) 112 may generate an electronic communication 113 for offered merchandise 114. The electronic communication 113 may be transmitted over one or more network(s) 108 to one or more user devices 104 operated by one or more users 102. The one or more users 102 may select an option in the electronic communication 113 to purchase the offered merchandise 114. A request may be transmitted from the user device 104 to the merchandise purchase computer(s) 112. The merchandise purchase computer(s) 112 may verify the identification of the user 102 requesting to purchase the offered merchandise 114. The merchandise purchase computer(s) 112 may facilitate the transaction to enable the user 102 to purchase the offered merchandise 114. The merchandise purchase computer(s) 112 may communicate with the merchandise provider datastore 110 over the one or more network(s) 108 to retrieve the offered merchandise 114 or to otherwise facilitate the delivery of the offered merchandise 114. In some embodiments, the merchandise purchase computer(s) 112 may facilitate delivery of the offered merchandise 114 to one or more e-reader devices 116 associated with the user 102 who purchased the offered merchandise. Alternatively, in some embodiments, the merchandise purchase computer(s) 112 may facilitate delivery of consumer goods or services to an address associated with the user 102.

Merchandise purchase computer(s) 112, merchandise provider datastore 110, user devices 104, and/or e-reader devices 116 may be configured to communicate with one another via one or more network(s) 108. The user device(s) 104 may also be configured to communicate via the network(s) 108 with any of the other devices. The network(s) 108 may include, but are not limited to, any one or more different types of suitable communications networks, such as cable networks, the Internet, wireless networks, cellular networks, or other private and/or public networks. Further, the network(s) 108 may include any type of medium over which network traffic may be carried including, but not limited to, coaxial cable, twisted-pair wire, optical fiber, hybrid fiber coaxial (HFC), microwave terrestrial transceivers, a radio frequency communication medium, a satellite communication medium, or any combination thereof.

Merchandise purchase computer(s) 112 may generate an electronic communication 113, such as an email, offering merchandise for purchase. In some implementations, merchandise may include but is not limited to electronic books, articles, movies, music, physical products (e.g., housewares, clothing, and so forth), and services (e.g., car maintenance, house cleaning, spa services, and so forth). The generated electronic communication 113 may comprise a token used to verify the identity of the user 102. This process will be discussed in further detail in association with FIGS. 7A-7B below. Merchandise purchase computer(s) 112 may transmit the electronic communication 113 to one or more user devices 104. User devices 104 may present the electronic communication 113 to a user 102.

The user 102 may select an option in the electronic communication 113 to directly purchase the offered merchandise 114. The user may select the option, for example, by selecting a hyperlink included in the electronic communication 113. Merchandise purchase computer(s) 112 may receive an indication, such as a request, from the user device 104 to purchase the offered merchandise 114. The merchandise purchase computer(s) 112 may use information received from the user device 104 to verify the identity of the user 102. Upon verification of the user identity, the merchandise purchase computer(s) 112 may process a transaction for the purchase of the offered merchandise 114.

Upon completion of the processing of the transaction, the merchandise purchase computer(s) 112 may retrieve the merchandise locally, such as from a datastore, for delivery to the device 116, or alternatively, it may retrieve merchandise from the merchandise provider datastore 110, merchandise or otherwise facilitate the delivery of the purchased offered merchandise 114 by the merchandise provider datastore 110. In some embodiments, the merchandise purchase computer(s) 112 and/or the merchandise provider datastore 110 may communicate merchandise over one or more network(s) 108 to an e-reader device 116 or one or more user devices 104 associated with the user 102 who purchased the offered merchandise 114. In some embodiments, user device 104 and e-reader device 116 may be the same device. In some embodiments, user device 104 and e-reader device 116 may be associated devices which may communicate through private networks or the like. In some embodiments, the associated devices may share the offered merchandise 114. For example, a user 102 purchased the offered merchandise 114 for a user device 104, in some implementations, the user device 104 may share the offered merchandise received after the purchase transaction with an associated e-reader device 116.

Figure 2:
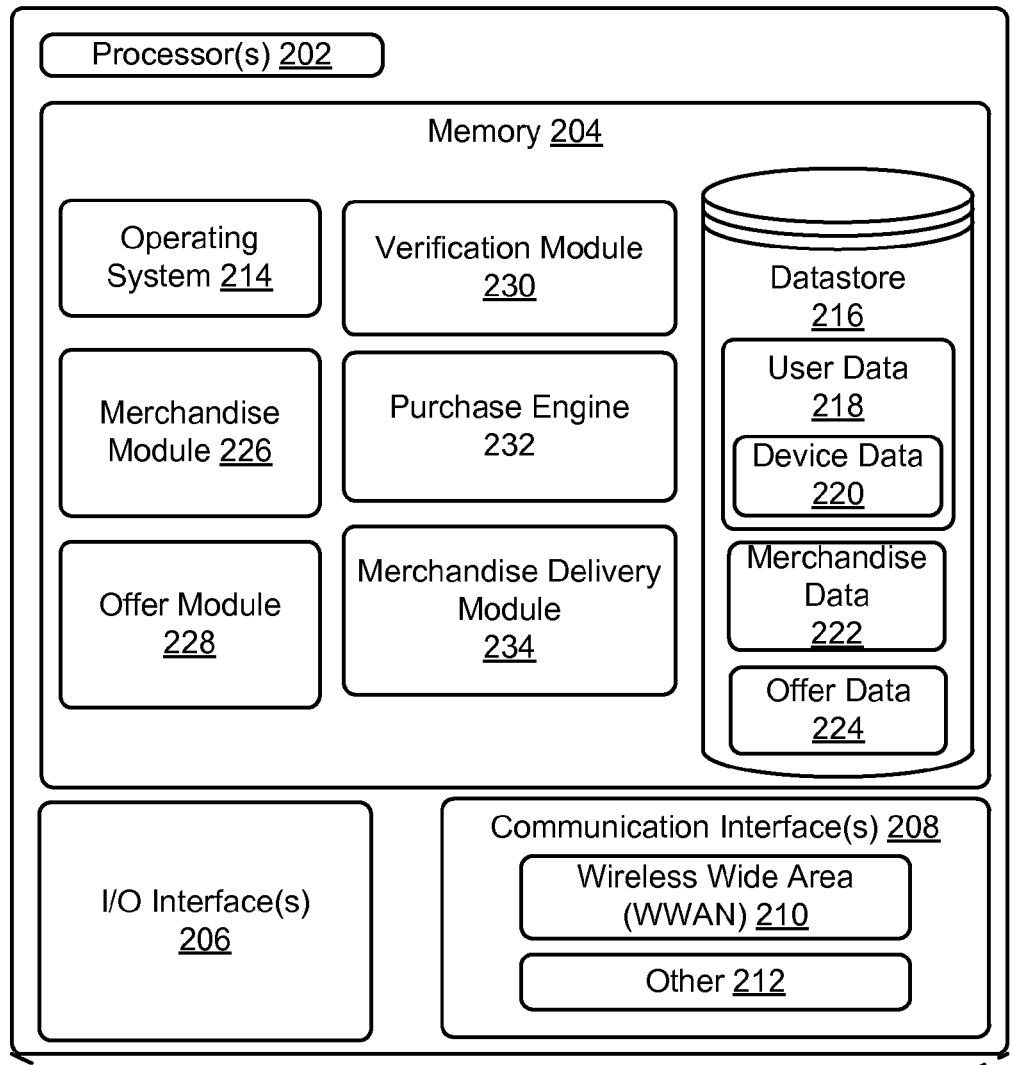
FIG. 2 illustrates a block diagram of a merchandise purchase computer in accordance with an embodiment of the disclosure.

FIG. 2 illustrates a block diagram 200 of the merchandise purchase computer 112. The merchandise purchase computer 112 facilitates the purchase of merchandise offered to a user 102 through an electronic communication 113, such as an email, a contextual advertisement, a text message, or an in-line advertisement. The merchandise purchase computer 112 may generate a communication 113 associated with the offered merchandise 114, verify the identity of a user 102 associated with a request to purchase the offered merchandise 114, process the purchase transaction, and/or coordinate delivery of the offered merchandise 114. The merchandise purchase computer 112 may be deployed in a stand-alone server such as depicted here, distributed across multiple servers, or provided as a cloud service.

The merchandise purchase computer 112 may comprise one or more processors 202, one or more memories 204, one or more input/output (I/O) interfaces 206, and one or more communication interfaces 208. The one or more processors 202 may individually comprise one or more cores and are configured to access and execute, at least in part, instructions stored in the one or more memories 204. The one or more memories 204 comprise one or more computer-readable storage media (CRSM). The one or more memories 204 may include, but are not limited to, random access memory (RAM), flash RAM, magnetic media, optical media, and so forth. The one or more memories 204 may be volatile in that information is retained while providing power or nonvolatile in that information is retained without providing power.

Similar to those described above, the one or more I/O interfaces 206 allow for coupling of devices such as displays, keyboards, storage devices, and so forth to the one or more processors 202 of the merchandise purchase computer 112. Likewise, the one or more communication interfaces 208 may be configured to couple the merchandise purchase computer 112 to one or more networks 108. For example, the one or more communication interfaces 208 may include a wireless wide area network (WWAN) 210 interface, a network interface for other networks 212 such as a local area network (LAN) connection to an Internet service provider, and so forth.

The one or more memories 204 may store instructions for execution by the one or more processors 202 that perform certain actions or functions. These instructions may include an operating system 214 configured to manage hardware resources, such as the I/O interfaces 206, and provide various services to applications executing on the one or more processors 202. The one or more memories 204 may also store one or more datastores 216 containing information. These datastores 216 may comprise lists, arrays, databases, flat files, and so forth. In some implementations, the datastores 216 may be stored in memory external to the merchandise purchase computer 112 but accessible via a network 108, such as with a cloud storage service.

The datastore 216 may include user data 218. The user data 218 may comprise information associating users 102 with one or more e-reader devices 116. User preferences, such as opt-in selection for receiving advertising for merchandise offers, opt-in selection for direct purchase of offered merchandise from electronic communications, electronic communication preferences (e.g., frequency of communication and format of communication), device preferences (e.g., default device for receipt of merchandise), payment methods, delivery addresses, purchase history, and so forth, may also be stored in the user data 218. The user data 218 may be used during generation and/or distribution of electronic communications that include offered merchandise 114, which may include, but is not limited to, books, music, movies, products, and services.

In some embodiments, datastore may include device data 220. Device data 220 may be a part of user data 218. Device data 220 stored in the datastore 216 may comprise information about the device associated with a user 102 (e.g., user devices 104, e-readers 116, tablets, desktop computers, laptop computers, smartphones, game consoles, and so forth), such as operating system, display resolution, and so forth. This information may be general information across several device(s) (e.g., display capabilities of a particular model of the device, language support, and so forth) or specific to a particular device such as indicating 1.2 GB of storage is available locally on the device. The device data 220 may be used during generation and/or distribution of electronic communications 113 that include offered merchandise 114 and/or the delivery of the merchandise 114 to a particular device. This device data 220 may be provided by the user device 104 and/or e-reader device 116, from the user 102, from a manufacturer or distributor of the e-reader device 116, and so forth.

The datastore 216 may also store merchandise data 222, in association with the offer, sale and delivery of merchandise such as music, videos, e-books, applications, and so forth. The merchandise data 222 may store merchandise identifiers, merchandise availability for particular devices, merchandise type, merchandise delivery method, merchandise size and/or duration, and so forth. The merchandise data 222 may comprise static text and graphics, hyperlinks, referents, and so forth. As mentioned above, in some implementations, the datastore 216 or a portion thereof may be external to the merchandise purchase computer 112. For example, the datastore of the merchandise data 222 may be provided by a third-party such as a purveyor of e-books, video, music, consumer goods, services, and so forth.

The datastore 216 may also store offer data 224. As mentioned above, in some implementations, the datastore 216 or a portion thereof may be external to the merchandise purchase computer 112. The offer data 224 may store offer identifiers, offer details, such as duration of the offer, price of the merchandise, availability of the merchandise, eligibility for the offer, and so forth.

Within the one or more memories 204, one or more modules may be stored. As used herein, the term module designates a functional collection of instructions that may be executed by the one or more processors 202. For convenience in description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

A merchandise module 226 may be configured to receive, aggregate, and generate information associated with merchandise. In one implementation, the merchandise module 226 may receive information associated with merchandise, generate a merchandise identifier, generate recommendations for merchandise offers based upon, at least in part, availability of merchandise, generate recommendations for merchandise offers based upon, at least in part, trends in purchases, and so forth. The merchandise module 226 may be configured to identify particular options or parameters associated with a particular merchandise provider, a particular type of merchandise, and so forth. For example, the merchandise module 226 may identify or determine that a particular merchandise provider only provides an e-book for a particular type of e-reader device 116. In another example, the merchandise module 226 may identify or determine that a particular merchandise provider will not make international shipments of products (e.g., books, CDs, DVDs, physical goods). In another example, the merchandise module 226 may identify or determine that a merchandise provider is a service provider, and the services are limited to a particular geographic location. The merchandise module 226 may provide other functionality as well. In one implementation, the merchandise module 226 may periodically check for the availability of the offered merchandise 114, may classify the types of offered merchandise, and so forth. The merchandise module 226 may be configured to transmit or otherwise make merchandise available. In some embodiments, the data generated or maintained by the merchandise module 226 may be stored as merchandise data 222 in the datastore 216.

An offer module 228 may be configured to receive, aggregate, or generate information associated with offers for merchandise. In some implementations, the offer module 228 may generate offers for merchandise based upon, at least in part, information received from the merchandise module 226. The offer module 228 may generate offer identifiers associated with the generated merchandise offers. In some embodiments, the offer module 228 may adjust the number of generated offers for merchandise to include particular parameters. These parameters may limit presentation or distribution of the generated offers, such as limiting offers to users who recently purchased a particular type of e-reader device 116 and only for a pre-determined period of time. The offer module 228 may provide other functionality as well. In some embodiments, the offer module 228 may extend the duration of existing offers for (e.g., based upon, at least in part, the response, number of offered items in inventory, and so forth), acquire offer redemption statistics, and so forth. These offer redemption statistics may be provided to the users 102, the merchandise provider datastore 110, the merchandise purchase computers 112, or a combination thereof. The offer module 228 may store information generated, received, or otherwise associated with offers for merchandise as offer data 224 in the datastore 216.

A purchase engine 232 may be configured to facilitate and/or effectuate a purchase transaction of offered merchandise 114. In some embodiments, the purchase engine 232 may be configured to generate a token. In some embodiments, the token may be generated based upon, at least in part, an offer identifier and a user identifier. The purchase engine 232 may be configured to generate a communication, such as an email. To generate the communication, the purchase engine 232 may retrieve user data 218, device data 220, merchandise data 222, and/or offer data 224. The purchase engine 232 may embed the token or otherwise associate the token with the communication and transmit the communication to an email address associated with the intended recipient. The email address for a user may have been retrieved with the user data 218. The purchase engine 232 may receive a request from a user 102 via a user device 104 to purchase the offered merchandise 114 and process the request. This is discussed in more detail below.

A verification module 230 may be configured to verify the identity of a user 102 requesting to purchase the offered merchandise 114. The verification module 230 may be configured to access the user data 218 in the datastore 216. In some implementations, the verification module 230 may be configured to determine if the intended recipient of the electronic communication containing the offer for the merchandise is the same person requesting to purchase the offered merchandise 114. For example, the verification module 230 may receive the request to purchase the offered merchandise 114. The request may comprise the token associated with the electronic communication 113 (e.g., email, advertisement, and so forth) sent to a user for the offered merchandise and a cookie associated with the user device 104 used to send the purchase request.

The verification module 230 may analyze the token and the cookie to determine if the intended recipient of the email is the same as the user 102 requesting to purchase the merchandise. In one example, the verification module 230 may determine that the intended recipient of the email and the requesting user are the same, that is, for example, associated with the same user account. In another example, the verification module 230 may determine that the intended recipient of the email and the requesting user are not the same. In some embodiments, the verification module 230 may generate a hash using information received in a request to purchase the offered merchandise. For example, the request may comprise the token embedded in the original offer email, a cookie associated with the user device requesting to purchase the offered merchandise, and the offer identifier from the offer email. The verification module 230 may generate the hash using the offer identifier and a user identifier obtained from the cookie. The verification module 230 may compare the value of the generated hash and the value of the token to determine and/or verify whether the recipient of the offer email is the same person requesting to purchase the offered merchandise. The verification module 230 may transmit the results of the determination and/or verification to the purchase engine 232.

A merchandise delivery module 234 is configured to deliver or facilitate the delivery of the offered merchandise 114 purchased by the user 102. In some embodiments, the purchased offered merchandise 114 may be transmitted to one or more of the e-reader devices 116 and/or user devices 104. In some embodiments, the user device 104 and the e-reader device 116 may be the same device. In some embodiments, the user device 104 and the e-reader device 116 may be associated devices, where the purchased content may be shared between the devices. The merchandise delivery module 234 may use the communication interfaces 208 and send the purchased offered merchandise 114 or a link or other referent thereto via the WWAN 210 or other 212 networks to the e-reader device 116. In another implementation, the merchandise delivery module 234 may provide the purchased offered merchandise 114, a link to the merchandise, and so forth to a storage location or service associated with the particular user 102, the particular e-reader device 116, or both.

To aid in the delivery of the offered merchandise 114, the merchandise delivery module 234 may be configured to access data including, but not limited to, cookies, universal serial bus connection data, previously used delivery options, user login data, or user preferences. This data may be present on the user device 104. For example, the merchandise purchase computer 112 may be configured to receive an identifier associated with a user 102, such as a user account number, and a serial number of the user device 104. This information, alone or in combination, may be used to designate a default e-reader device 116 to which the purchased offered merchandise 114 may be sent. In other implementations, the designation of a user device 104 and/or an e-reader device 116 may be retrieved from other sources external to the user device 104.

Figure 3:
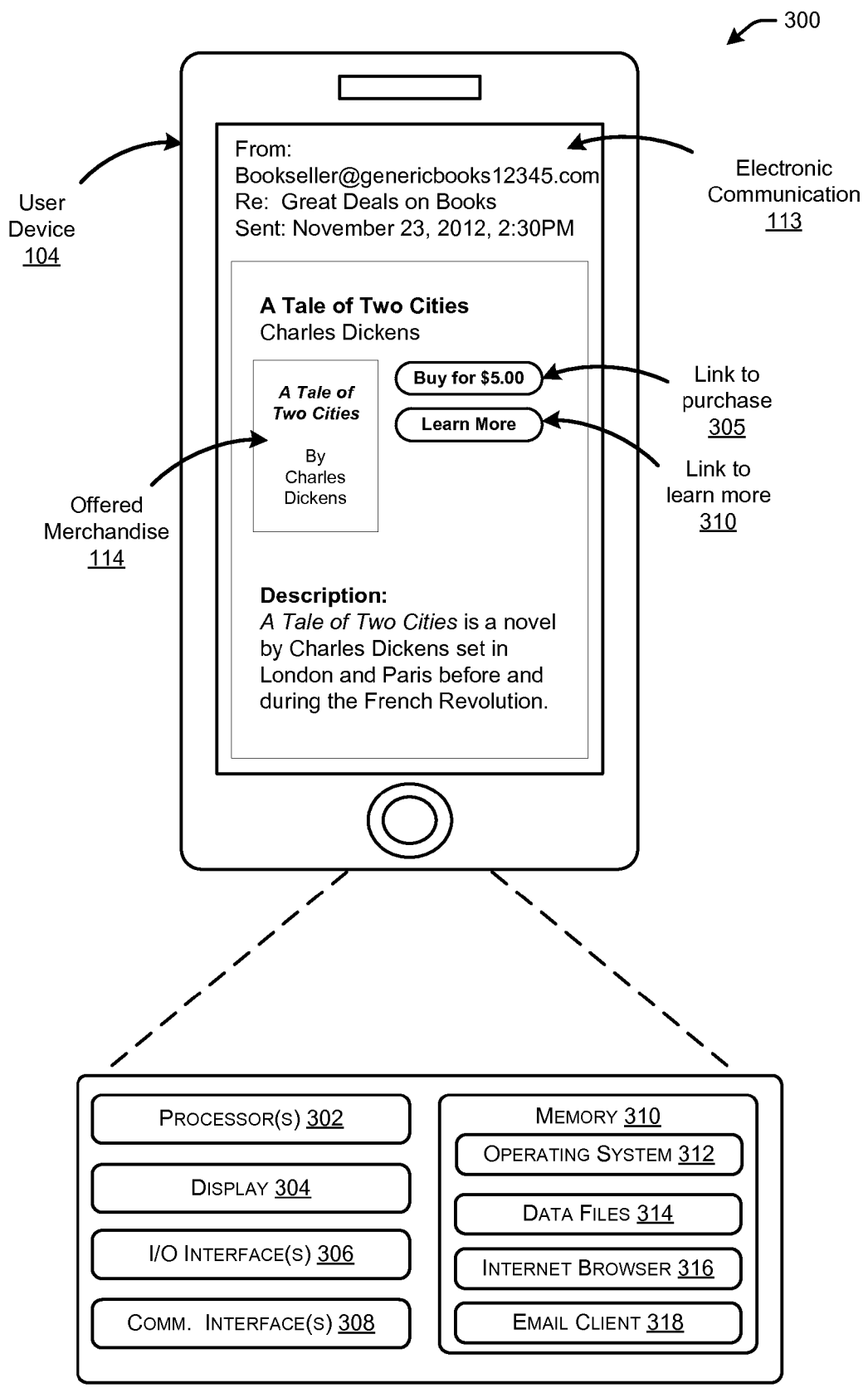
FIG. 3 illustrates components of a user device and presentation of the electronic communication for offered merchandise thereon in accordance with an embodiment of the disclosure

FIG. 3 illustrates components of the user device 104 and presentation 300 of the communication comprising the offered merchandise 114. The user device 104 comprises one or more processors 302, one or more memories 310, one or more displays 304, one or more I/O interface(s) 306, and one or more communication interfaces 308.

The processor 302 may comprise one or more cores and is configured to access and execute, at least in part, instructions stored in the one or more memories 310. The one or more memories 310 comprise one or more CRSMs.

The display 304 is configured to present visual information to the user 102. In some implementations, the display 304 may comprise an emissive display configured to emit light to form an image. Emissive displays include, but are not limited to, backlit liquid crystal displays, plasma displays, cathode ray tubes, light-emitting diodes, e-ink, image projectors, and so forth.

The one or more I/O interfaces 306 may also be provided in the user device 104. These I/O interfaces 306 allow for coupling devices, such as keyboards, joysticks, touch sensors, cameras, microphones, speakers, haptic output devices, memory, and so forth, to the user device 104.

The one or more communication interfaces 308 provide for the transfer of data between the user device 104 and another device directly, via a network 108, or both. The communication interfaces 308 may include, but are not limited to, personal area networks (PANs), wired local area networks (LANs), wireless local area networks (WLANs), wireless wide area networks (WWANs), and so forth. The communication interfaces 308 may utilize acoustic, radio frequency, optical, or other signals to exchange data between the user device 104 and another device such as an access point, a host computer, a router, a e-reader device, another user device 104, and the like.

The one or more memories 310 may store instructions for execution by the processor 302 to perform certain actions or functions. These instructions may include an operating system 312 configured to manage hardware resources, such as the I/O interfaces 306, and provide various services to applications executing on the processor 302. The one or more memories 310 may also store data files 314 containing information about the operating system, previously stored merchandise, portions of merchandise, configuration files, and so forth.

An Internet browser application 316 may be stored in the one or more memories 310. The Internet browser application 316 may receive or access one or more offers for merchandise via a network 108 or from the data files 314. In some embodiments, the Internet browser application 316 may access a web-based email account associated with a user 102. The communication associated with an offer for merchandise may be sent to the email account and/or presented on a webpage.

The Internet browser application 316 of the user device 104 may be configured to accept input, such as an Internet or web page coded input using a markup language such as Hyper Text Markup Language (HTML), and present the offer for merchandise to the user 102, such as via the display 304.

An email client application 318 may be stored in the one or more memories 310. The email client application 318 may receive electronic communications (e.g., email communication, SMS, and so forth) comprising one or more offers for merchandise via a network 108 or from the data files 314. The electronic communication may comprise a hyperlink or uniform resource identifier (URI) such as a URL to a website. Selecting the hyperlink or URI may invoke the Internet browser application 316 that may present more details about the offered merchandise or initiate the communication of a request to purchase the offered merchandise 114.

As shown here, the user device 104 is presenting the communication from the merchandise purchase computer(s) 112, which identifies the offered merchandise 114, an in certain embodiments, information associated with the offered merchandise 114, a link 305 to directly purchase the offered merchandise 114 from the electronic communication 113, and a link 310 to learn more about the offered merchandise 114. As shown here by way of illustration and not as a limitation, the link 305 to purchase the offered merchandise 114 and the link 310 to learn more about the offered merchandise 114 may be presented in the form of buttons. In some implementations, the links 305, 310 may be presented in the form of a URI. In some embodiments, selection of the links 305, 310 may invoke the Internet browser application 316 to facilitate the purchase of the offered merchandise 114.

Figure 4:
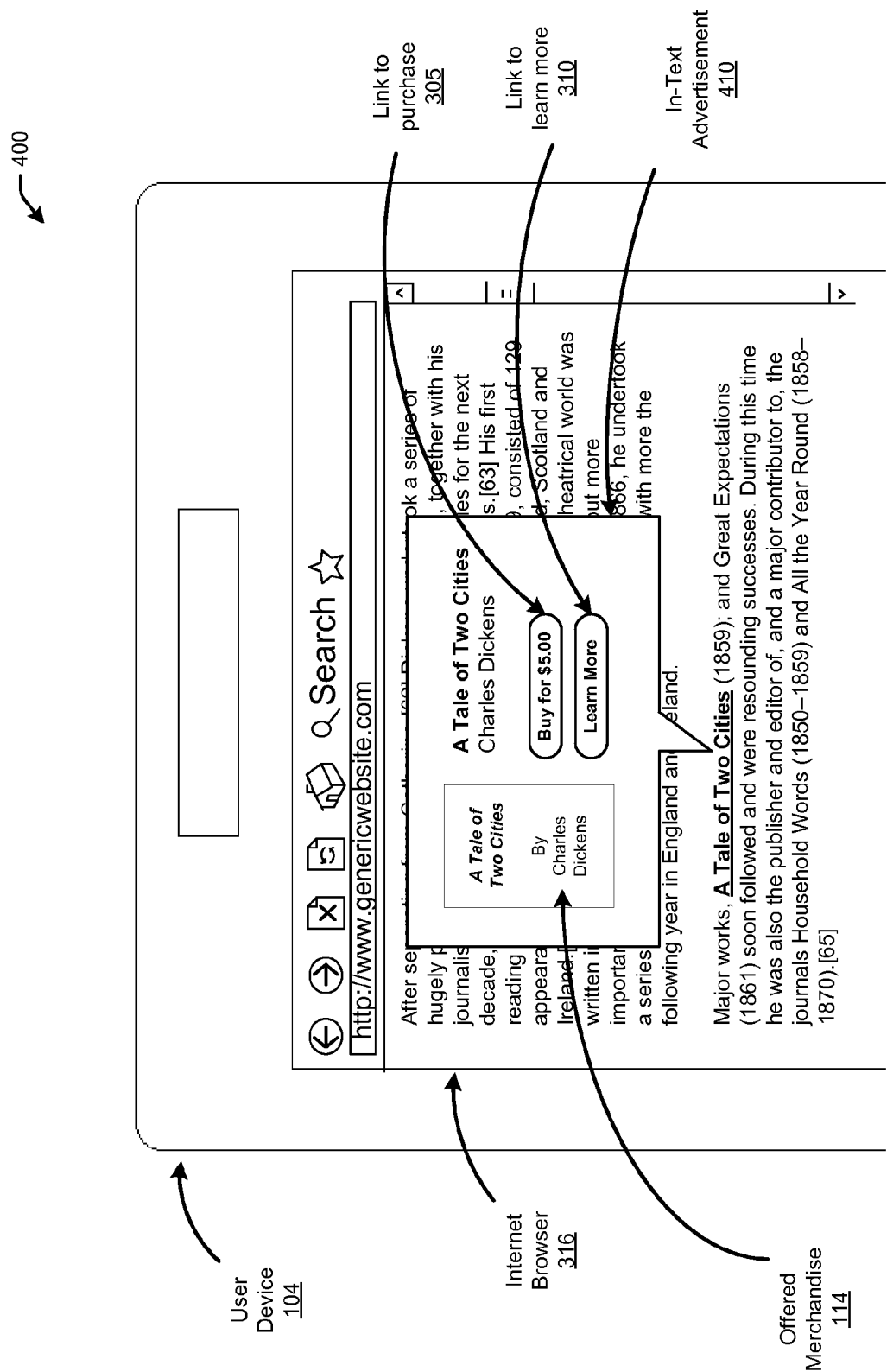
FIG. 4 illustrates a user device and presentation of an in-text advertisement for offered merchandise thereon in accordance with an embodiment of the disclosure.

FIG. 4 illustrates a user device 104 and another presentation 400 of one embodiment of the offered merchandise 114. In this illustration, the offered merchandise 114 is presented in the form of an in-text advertisement 410. In some implementations, in-text advertisements 410 may include advertisements which are placed as hyperlinks within existing text of webpages. In some embodiments, if a user hovers over an in-text advertisement, a bubble or hover-over window may be presented with an advertisement. The presentation 400 illustrates an in-text advertisement 410 in the form of a bubble containing an advertisement for the offered merchandise 114, a link 305 to purchase the offered merchandise 114, and a link 310 to learn more about the offered merchandise 114. In some embodiments, the in-text advertisement 410 may be indicated by a double-underline. Selecting an in-text advertisement 410 may generate a pop-up window containing the offered merchandise 114 and links 305, 310.

Figure 5:
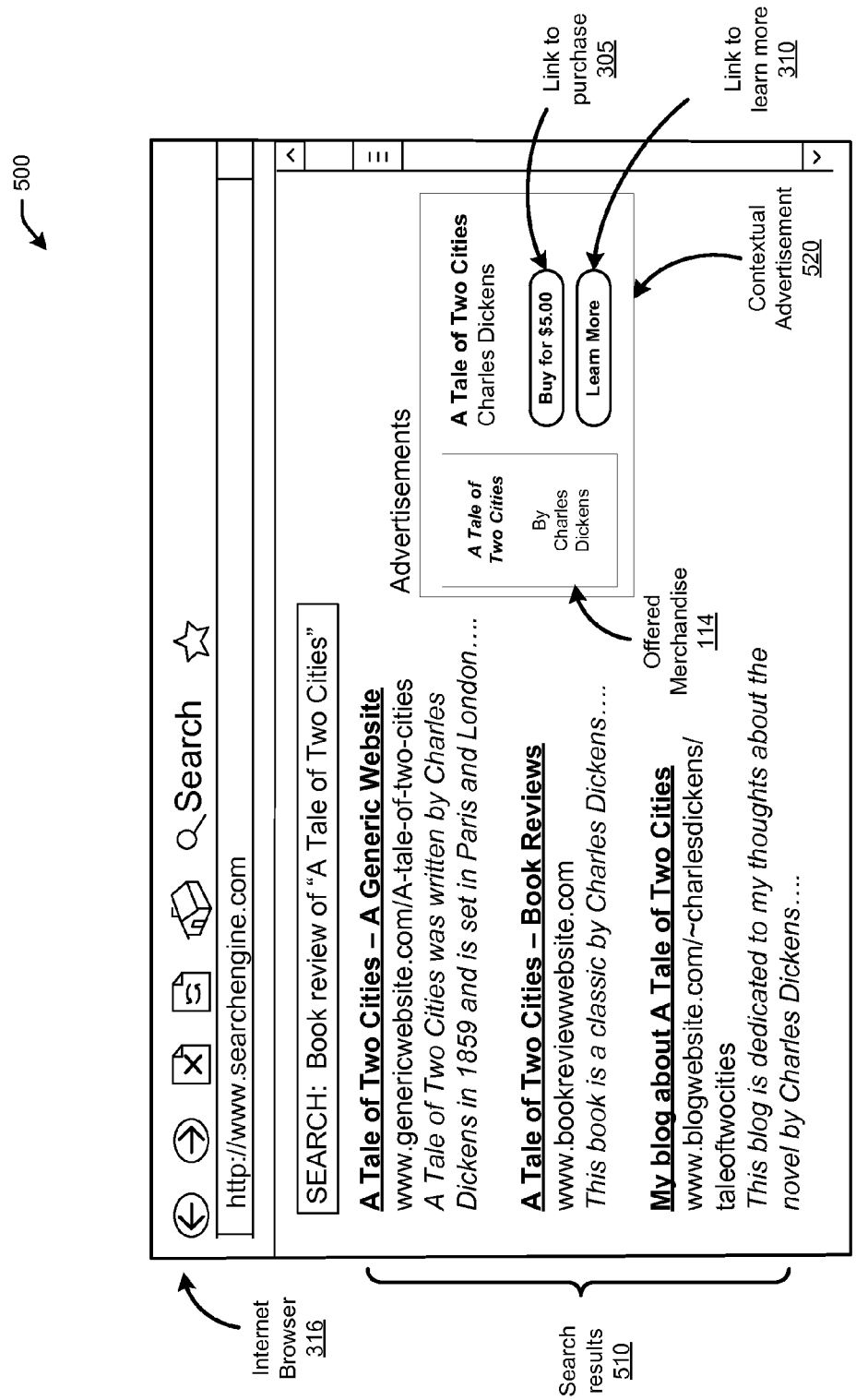
FIG. 5 illustrates a user device and presentation of a contextual advertisement for offered merchandise thereon in accordance with an embodiment of the disclosure.

FIG. 5 illustrates a user device and presentation of a contextual advertisement for offered merchandise thereon in accordance with an embodiment of the disclosure. In this illustration, a contextual advertisement 520 is presented in association with search results 510 generated in response to a search by the user 102 for a book review for "A Tale of Two Cities" on an Internet browser application 316. As depicted in the presentation 500, contextual advertisements 520 may be advertisements that are related to the text but appear next to the text, rather than within the text (e.g., in-text advertisements 410). For example, a user may search for a review for a book.

Illustrative Processes

Figure 6:
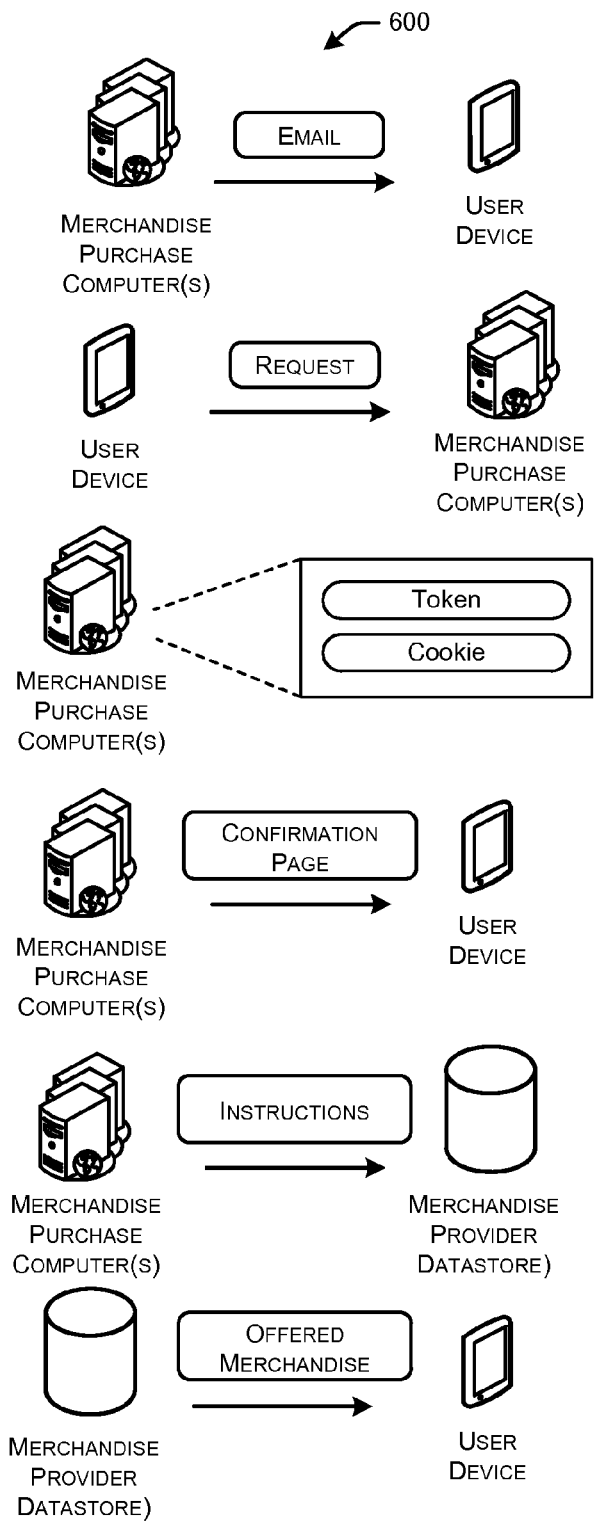
FIG. 6 illustrates an exemplary process for direct merchandise purchasing in accordance with an embodiment of the disclosure.

FIG. 6 schematically depicts an exemplary process 600 for the direct purchase of merchandise from an email, in accordance with one or more embodiments of the disclosure. FIG. 6 will be described in the context of the merchandise purchase computer(s) 112, the user device(s) 104, the merchandise provider datastore 110, and the e-reader device(s) 116 schematically depicted in FIGS. 1-2.

The process 600 may include, at 602, generation and transmission of an electronic communication 113 offering merchandise from the merchandise purchase computer(s) 112 to the user device(s) 104. In some embodiments, the merchandise purchase computer(s) 112 may generate an electronic communication 113, such as an email, associated with a token. A token may be a session token, which is a unique identifier, usually in the form of a hash generated by a hash function. The token may be generated and sent between computers to identify the current interaction session. In some embodiments, the token may be generated by the merchandise purchase computer(s) 112 based upon, at least in part, a user identifier and/or an offer identifier. A user identifier may be an identifier associated with a user, such as an email address, customer identifier, account number, telephone number, social security number, and so forth. The user identifier may be associated with information pertaining to the user 102, such as user preferences, billing information, purchase history, shipping addresses, associated e-reader devices, and other information. An offer identifier may be a unique identifier associated with an offer for merchandise. An offer identifier may be a unique identifier generated by the merchandise purchase computer(s) 112. For example, an offer may be for the sale of merchandise. The offer identifier may be associated with one or more aspects of the offered merchandise, such as the format of the merchandise, duration of the offer, the availability of the offered merchandise 114, the availability of the offered merchandise 114 in a geographic location, and so forth. Data associated with the offered merchandise 114 may be received or obtained from the merchandise provider datastore 110.

At 604, a request to purchase the offered merchandise 114 may be received by the merchandise purchase computer(s) 112 from the user device 104. In some embodiments, the user device 104 may transmit to the merchandise purchase computer(s) 112 a request to purchase the offered merchandise 114 by selecting a button or a hyperlink in the email sent to the user device 104 by the merchandise purchase computer(s) 112. In some embodiments, the request may comprise the token sent in the email to the user device 104 and a cookie from the Internet browser application 316 of the user device 104. In some implementations, an Internet browser application 316 may transmit in the request to purchase the offered merchandise 114, a cookie, or part of a cookie, that contains identifying information associated with a user 102 of the user device 104. For example, if a user 102 signed into a retail website using an Internet browser application 316, prior to receiving the email from the merchandise purchase computer(s) 112, the Internet browser application 316 may generate and transmit a cookie (or a portion of the cookie) of the user device 104 to another device, such as merchandise purchase computer(s) 112. The cookie may comprise information associated with the user 102 such as user activity, user identifier, user preferences, and tracking information to track the actions of a user. All or some of the cookie may be transmitted with the request to the merchandise purchase computer(s) 112.

At 606, the merchandise purchase computer(s) 112 may verify user identity based upon the token from the offer email and the information from the user device 104, such as a cookie. The merchandise purchase computer(s) 112 may determine whether the intended recipient of the email transmitted at 602 is the same as the user requesting to buy the offered merchandise 114.

At 608, the merchandise purchase computer(s) 112 may process the transaction for the purchase of the offered merchandise and transmit confirmation to the user device 104. In some embodiments, the merchandise purchase computer(s) 112 may process the transaction using user data 218 received and/or retrieved from the datastore 216. In some embodiments, the received request may comprise an indication of a payment method associated with the direct purchase configuration associated with a user 102. In some embodiments, if the transaction fails, for example, due to a problem with the payment method (e.g., expired credit card), the merchandise purchase computer(s) 112 may request information from the user 102 which may be displayed by the user device 104. For example, if the transaction fails, the user device 104 may receive a request to display a page to the user 102 requesting selection of a different payment method or updated credit card information.

Upon completion of the transaction to effectuate the purchase, the merchandise purchase computer(s) 112 may transmit a confirmation of the transaction to the user device 104. In some embodiments, the confirmation may be a webpage displaying the details of the transaction. In some embodiments, the confirmation may request additional information from the user 102. For example, if the user data 218 associated with the user 102 indicates multiple e-reader devices 116, the confirmation page may list the associated e-reader devices 116 and request that the user select a specific e-reader device 116 for delivery of the purchased offered merchandise 114.

At 610, the merchandise purchase computer(s) 112 may transmit instructions to the merchandise provider datastore 110 to deliver the purchased offered merchandise 114. Alternatively, the merchandise purchase computer(s) 112 may receive the offered merchandise 114 from the merchandise provider datastore 110 and then in turn deliver the offered merchandise 114. In some embodiments, the instructions to deliver the merchandise may specify one or more devices (e.g., user device 104, e-reader device 116) for merchandise delivery. In some embodiments, if the merchandise is a physical good or service, the merchandise purchase computer(s) 112 may transmit instructions to deliver merchandise that specifies the shipping address of the merchandise, the shipping method, the recipient of the merchandise, and so forth.

At 612, the merchandise provider datastore 110 may deliver merchandise to the user device 104. In some embodiments, if the offered merchandise 114 is in an electronic format, the merchandise provider datastore 110 may deliver the merchandise to one or more devices (e.g., the user device 104 and/or the e-reader device 116). In some embodiments, if the offered merchandise 114 is a physical object or service, the merchandise provider datastore 110 may facilitate delivery of the merchandise. For example, the merchandise provider datastore 110 may deliver to the offered merchandise 114 to an address designated at 610.

Figure 7A:
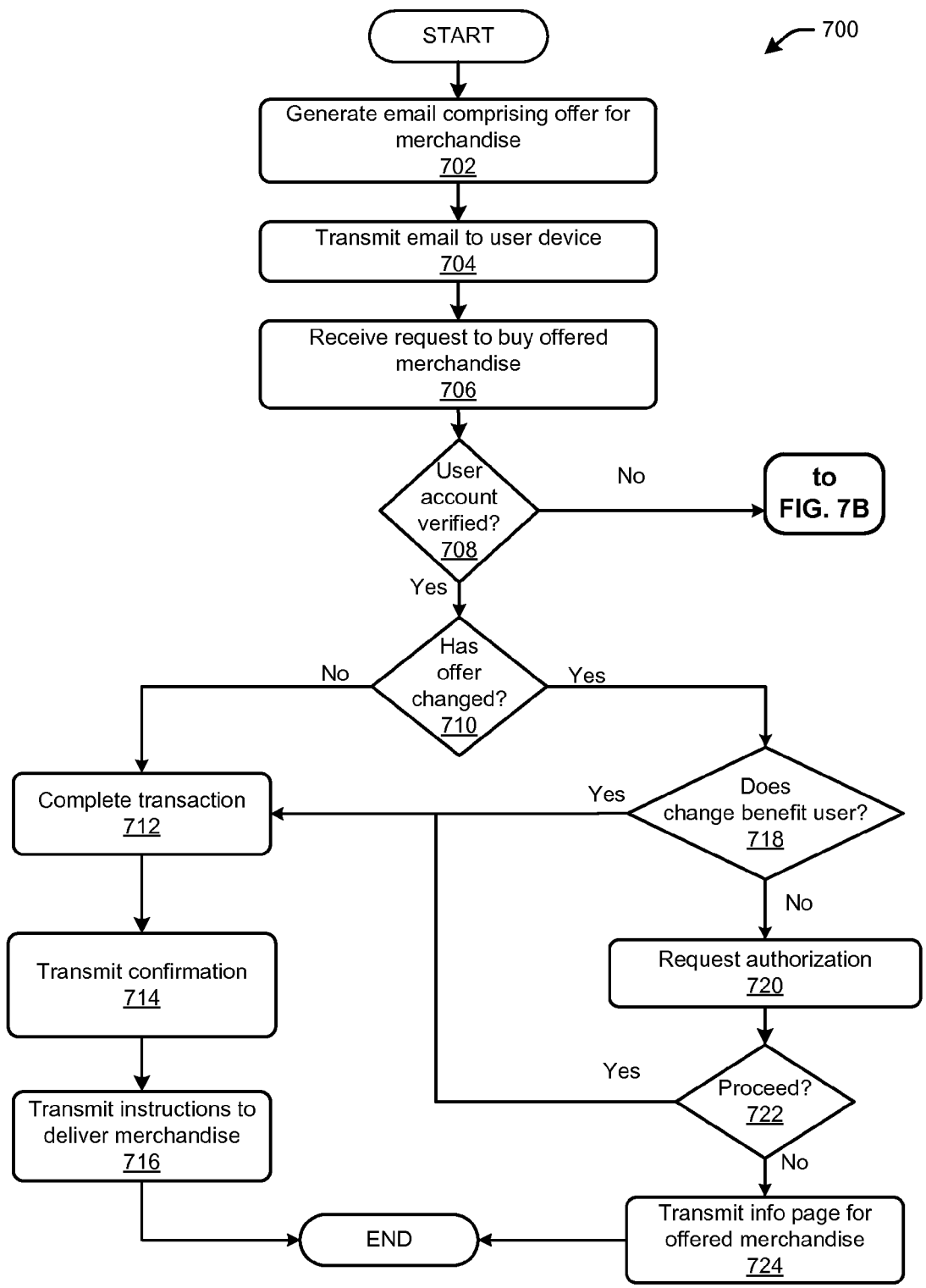
FIGS. 7A-7B illustrate a flow diagram of a process for providing direct merchandise purchasing in accordance with an embodiment of the disclosure.
Figure 7B:
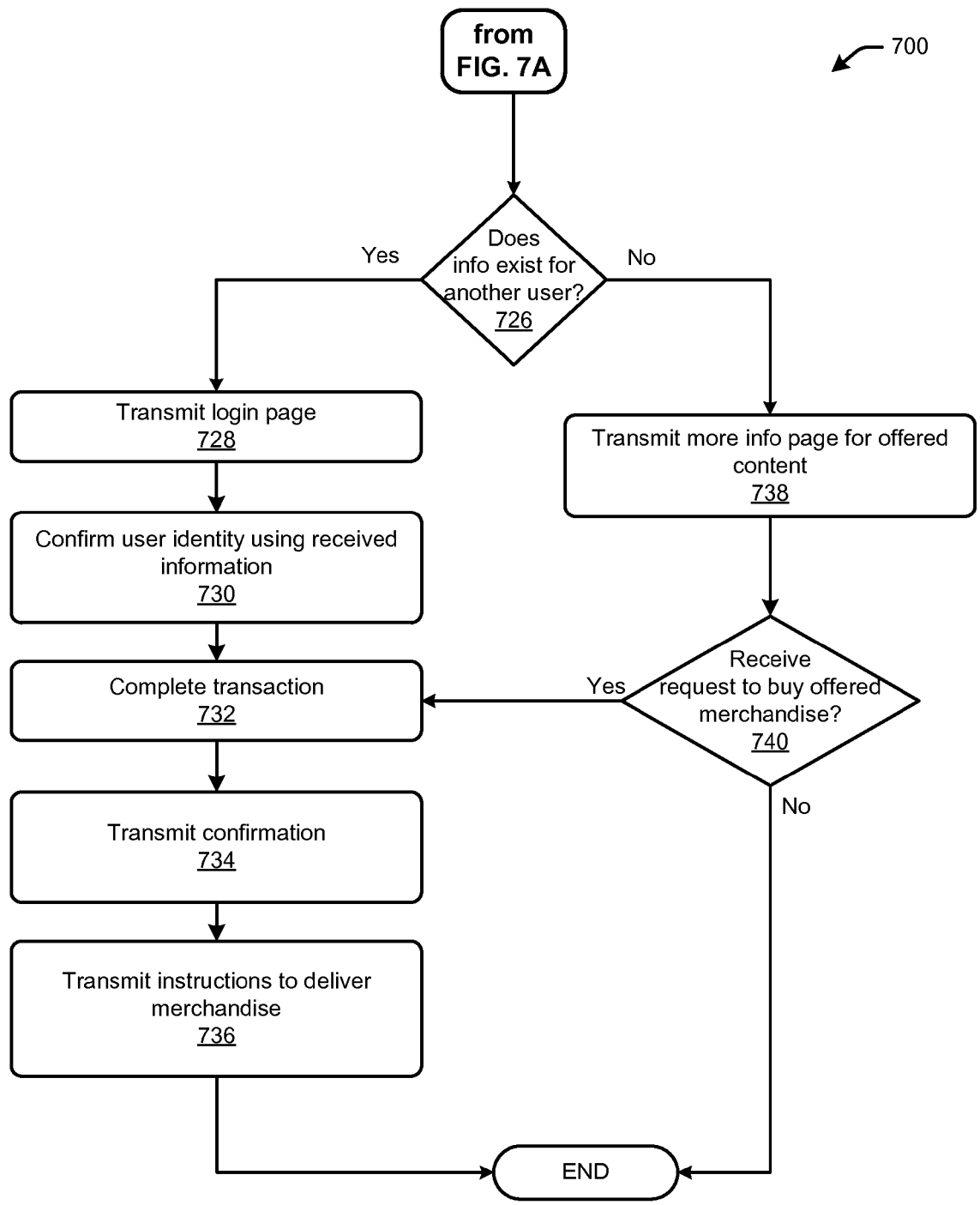

Now referring to FIGS. 7A-7B, an illustrative flow diagram of a process for providing direct merchandise purchasing in accordance with an embodiment of the disclosure is depicted.

FIGS. 7A and 7B depict a process flow diagram of an illustrative method 700 for direct merchandise purchase from an email. While specific operations of the method 700 are depicted, in one or more embodiments, additional operations may be performed or some operations may not be performed depending on the particular embodiment.

Referring now to FIG. 7A, at 702, the merchandise purchase computer(s) 112 may generate an email comprising an offer for merchandise 114. The email may be generated in response to a specific opt-in selection to receive offers for merchandise. In some embodiments, the email may be generated based upon, at least in part, user data 218, device data 220, merchandise data 222, and/or offer data 224. The email may be generated using preferences stored in association with a user 102 in user data 218. For example, the email may comprise a user's name and devices associated with the user 102. The email may comprise the offered merchandise 114 which may include an image of the merchandise, descriptive information associated with the merchandise, title, author, publisher, and so forth. The email may include details associated with the offered merchandise 114. For example, the email may contain the duration of the offer, the price of the offered merchandise 114, or a description of eligibility to redeem the offer. The email may also include one or more links, such as a link 305 to purchase the offered merchandise 114 and a link 310 to learn more about the offered merchandise. In some embodiments, the link 305 to directly purchase the offered merchandise 114 may be included if the user selected an option or opted-in to a program for the direct purchase of merchandise from an email. In some embodiments, the preference setting may be extrapolated from an existing indicated preference for direct purchase of merchandise from a webpage. In some embodiments, the email may comprise a token. The token may be a session token in the form of a hash generated by a hash function. In some embodiments, the hash may be generated by a hash function based upon, at least in part, a user identifier and an offer identifier. The token may be associated with the offer for merchandise and a user account of a user.

At 704, the merchandise purchase computer(s) 112 may transmit the email to a user device 104. The user 102 may receive the email through an Internet browser application 316 when checking an online email account. The user 102 may receive the email through an email client application 318 of a user device 104. In some embodiments, the user 102 may select the option (e.g., link 305) to directly purchase the merchandise from the email. In some embodiments, the user 102 may select the option (e.g., link 310) to learn more information about the offered merchandise 114. In some embodiments, the user 102 may forward the email to a different user.

At 706, the merchandise purchase computer(s) 112 may receive a request from a user device 104 in response to a selection of the link 305 to directly purchase the merchandise from the offer in the email. In some embodiments, the request may comprise the token transmitted in the email to the user 102. The request may also include the offer identifier from the offer in the email and data from the user device 104. For example, the Internet browser application 316 of the user device 104 may have transmitted the request with a cookie associated with the Internet browser application 316. The cookie may comprise information associated with the user device 104, such as a user identifier stored on the user device 104.

At 708, the merchandise purchase computer(s) 112 may verify the user account associated with the user. For example, the merchandise purchase computer(s) 112 may verify if the user requesting to purchase the offered merchandise 114 is the same as the intended recipient of the email. The merchandise purchase computer(s) 112 may verify the user based upon, at least in part, the request from the user device 104. For example, the request may comprise the token transmitted in the email to the user device 104, the offer identifier, and data from the user device. As discussed above, the token may be based, at least in part, on a user identifier and an offer identifier. For example, the token may be generated by a hash of the user identifier and the offer identifier. The token may be compared to information received from the user device 104, for example, information stored in the cookie received from the user device 104. The cookie may include a user identifier associated with the user 102 requesting to purchase the offered merchandise 114. In some embodiments, the verification module 230 may generate a hash using the offer identifier received in the request and a user identifier obtained from the data received from the user device (e.g., cookie). The hash generated by the verification module 230 may be compared to the token received in the request and originally transmitted in the email (or other form of communication, such as an advertisement) to the user. The verification module 230 may compare the token to the generated hash. The verification module 230 may determine that the token and the hash have the same value, the user account may be verified, indicating that the requesting user is the same user who received the offer email. The verification module 230 may compare the token to the generated hash and determine they do not have the same value, indicating that the requesting user is not the same user who received the offer email.

In some embodiments, the merchandise purchase computer(s) 112 may determine that the user requesting to purchase the offered merchandise 114 is not the same as the intended recipient of the email. The process associated with the determination that the users do not match (e.g., user is not verified) is discussed below in association with FIG. 7B.

If the merchandise purchase computer 112 determines the user requesting to purchase the offered merchandise 114 is the same as the intended recipient of the email, then at block 710, the merchandise purchase computer(s) 112 may determine whether the offer has changed. For example, the merchandise purchase computer(s) 112 may retrieve information associated with the offered merchandise 114 using the offer identifier from the token. Based upon the retrieved information, the merchandise purchase computer(s) 112 may determine if the offer has changed. If the offer has not changed, then at 712, the merchandise purchase computer 112 completes the financial transaction for the user to purchase the offered merchandise 114. In some embodiments, the merchandise purchase computer(s) 112 may retrieve payment information associated with the user 102 and stored in user data 218. In some embodiments, the payment method may have been included in the request from the user device 104. For example, if multiple methods of payment are associated with the user 102, the email may have listed the different methods and required the user 102 to specify a particular form of payment. If the transaction 712 could not successfully be completed due to outdated or incorrect payment information, the merchandise purchase computer(s) 112 may generate a message to the user device 104 requesting information necessary to complete the transaction.

Once the transaction is successfully completed, at 714, the merchandise purchase computer(s) 112 may transmit a confirmation. In some embodiments, the confirmation may be a webpage generated by the merchandise purchase computer(s) 112. In some embodiments, the confirmation may be an email message. The confirmation may include information about the transaction (e.g., time and date of transaction, method of payment, total amount), the offered merchandise, details regarding the delivery of the merchandise, and so forth.

At 716, the merchandise purchase computer(s) 112 may transmit instructions to facilitate the delivery of the purchased offered merchandise 114. For example, the merchandise purchase computer(s) 112 may instruct the merchandise provider datastore 110 to deliver the merchandise to a particular device (e.g., user device 104 and/or e-reader device 116). In some embodiments, the merchandise purchase computer(s) 112 may receive and/or obtain the purchased offered merchandise 114 and then transmit the merchandise to the specified device. In some embodiments, the merchandise purchase computer(s) 112 may facilitate delivery of the merchandise where the merchandise is a physical object, by providing a shipping address and preferred method of shipment. In some embodiments, the information may be transmitted to a third-party vendor responsible for delivering the merchandise.

In some embodiments, the merchandise may be delivered to device associated with the user 102 where previous merchandise was transmitted, a default device specified by the user 102 in user preferences stored in user data 218, or all devices associated with the user 102.

If the merchandise purchase computer(s) 112 determined at 710 that the offer had changed, then the merchandise purchase computer(s) 112 may have determined whether the change benefitted the user at 718. Examples of a change that may benefit the user may include a decrease in the price of the offered merchandise when compared to the price of the offered merchandise 114 in the email, a faster shipping date, or inclusion of additional merchandise with the purchase of the offered merchandise 114. If the change benefits the user, then the method proceeds to 712 (details of which are discussed above). Example of a change that may not benefit the user may include unavailability of the offered merchandise 114, suppression of the merchandise for a particular device type that may be associated with the user 102, merchandise no longer available in the country of residence of the user 102, or a price increase of the offered merchandise 114 when compared to the price in the email. If the merchandise purchase computer 112 determines the change does not benefit the user 102, then the merchandise purchase computer(s) 112 may request authorization to proceed with the transaction from the user 102 at 720. In some embodiments, a message is generated and transmitted to the user device 104. In some embodiments, the user may be contacted by other means, such as a text message, a telephone call, or another method of communication.

At 722, the merchandise purchase computer 112 determines whether to proceed with the transaction. The determination may be made based upon a confirmation or authorization received from the user 102. In other embodiments, the determination may be made based upon a user preference stored in user data 218. If the merchandise purchase computer 112 determines to proceed then the method may proceed to 712 (details of which are discussed above). If the merchandise purchase computer 112 determines not to proceed with the transaction, at 724, the merchandise purchase computer(s) 112 may transmit an information page for the offered merchandise 114. Responsive to receiving the information page, a user device 104 may display the information page for the offered merchandise 114 to the user 102. In some embodiments, the information page may include an indication that the transaction was not completed. In some embodiments, the information page may include a description of why the transaction was not completed.

Now referring to FIG. 7B, at 708 the merchandise purchase computer(s) 112 determined that the user 102 could not be verified. At 726, the merchandise purchase computer(s) 112 may determine whether the user device 104 is associated with a different user. For example, the user requesting to buy the offered merchandise 114 may be a user who did not receive the initial email from the merchandise purchase computer(s) 112, but rather received the email from someone else. The merchandise purchase computer(s) 112 may determine if the user device 104 is associated with another user by analyzing the information received from the user device 104. The user device 104 may have transmitted a cookie with the request to buy the offered merchandise 114. The cookie may include information, such as a customer identifier, associated with the user of the user device 104. In some embodiments, the user may have signed out of a session and therefore may not be currently authenticated by the user device 104 to directly purchase merchandise from an email.

If the merchandise purchase computer 112 determines that another user is associated with the user device 104, then at 728, the merchandise purchase computer(s) 112 may transmit a login page to the user device 104. The login page may request information from the user 102 to verify or authenticate the identity of the user. In some embodiments, the login page may request a user identifier. In some embodiments, the user identifier field may be populated by the merchandise purchase computer(s) 112 based upon the information from the cookie.

At 730, the merchandise purchase computer(s) 112 may confirm the identity of the user using information received via the login page. For example, the user may have supplied a user identifier and a password. The merchandise purchase computer(s) 112 may have compared the received information with information stored in association with the user in user data 218.

At 732, the merchandise purchase computer(s) 112 may complete the financial transaction for the user to purchase the offered merchandise 114. In some embodiments, the merchandise purchase computer(s) 112 may retrieve payment information associated with the user 102 and stored in user data 218. In some embodiments, the payment method may have been included in the request from the user device 104. If the transaction could not successfully be completed due to outdated or incorrect payment information, the merchandise purchase computer(s) 112 may generate a message to the user device 104 requesting information necessary to complete the transaction.

After the transaction is successfully completed, at 734, the merchandise purchase computer(s) 112 may transmit a confirmation. In some embodiments, the confirmation may be a webpage generated by the merchandise purchase computer(s) 112. In some embodiments, the confirmation may be an email message. The confirmation may include information about the transaction (e.g., time and date of transaction, method of payment, total amount), the offered merchandise, details regarding the delivery of the merchandise, and so forth.

At 736, the merchandise purchase computer(s) 112 may transmit instructions to facilitate the delivery of the purchased offered merchandise 114. For example, the merchandise purchase computer(s) 112 may instruct the merchandise provider datastore 110 to deliver the merchandise to a particular device (e.g., user device 104 and/or e-reader device 116). In some embodiments, the merchandise purchase computer(s) 112 may receive and/or obtain the purchased offered merchandise 114 and then transmit the merchandise to the specified device. In some embodiments, the merchandise purchase computer(s) 112 may facilitate delivery of the merchandise where the merchandise is a physical object, by providing a shipping address and preferred method of shipment. In some embodiments, the information may be transmitted to a third-party vendor responsible for delivering the merchandise.

If at 726, the merchandise purchase computer 112 determines that information does not exist for another user on the user device 104, at 738, the merchandise purchase computer(s) 112 may transmit a webpage detailing information about the offered merchandise 114. In some embodiments, the merchandise purchase computer(s) 112 may include in the webpage a message indicating that the user is unknown to the system. In some embodiments, the merchandise purchase computer(s) 112 may include in the webpage a link to enable the user 102 to create a user identifier and password.

At 740, after the merchandise purchase computer 112 has transmitted the webpage to the user device 104, at 740, the merchandise purchase computer(s) 112 may receive a request to buy the merchandise. If the merchandise purchase computer 112 receives a request to buy the offered merchandise 114, then the method proceeds to 732 (as described above). If the merchandise purchase computer 112 does not receive a request to buy the offered merchandise, then the method ends.

Conclusion

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:
   at least one memory device storing computer-executable instructions; and
   at least one processor configured to access the at least one memory device and execute the computer-executable instructions to:
   identify a user device to send an electronic communication;
   generate, based at least in part on display capabilities of the user device, the electronic communication comprising an offer for a sale of merchandise;
   prior to receiving a request to purchase merchandise from the user device, generate a token for a user and the user device using a hash function based at least in part on an offer identifier associated with the offer and a first identifier associated with a user account;
   incorporate the token into the electronic communication;
   send the electronic communication over a communication network to the user device, wherein the electronic communication causes the user device to present selectable indicia that enables selection of the offer;
   receive, over the communication network, from the user device, a request to purchase the merchandise, the request comprising the token, the offer identifier, the first identifier, and data associated with the display capabilities of the user device;
   generate a hash value based at least in part on the offer identifier and the first identifier;
   determine, based at least in part on the token, the hash value, and the data, that the offer was intended for an originator of the request and the user device; and
   process the request to purchase the merchandise.

2. The system of claim 1, wherein to determine that the offer was intended for the originator and the user device, the at least one processor is further configured to execute the computer-executable instructions to:
   transmit a request for first additional information; and
   receive the first additional information, wherein to process the request comprises to process a transaction for the purchase of merchandise, based at least in part on the first additional information.

3. The system of claim 2, wherein the at least one processor is further configured to execute the computer-executable instructions to:
   transmit a confirmation responsive to the transaction, wherein the confirmation comprises a second request for second additional information associated with delivery of the merchandise;
   receive the second additional information; and
   transmit instructions to deliver the merchandise based at least in part on the second additional information.

4. The system of claim 3, wherein the at least one processor is further configured to execute the computer-executable instructions to:
   receive the merchandise from one or more merchandise providers; and
   transmit instructions to send the merchandise.

5. The system of claim 3, wherein the second additional information comprises:
   one or more user devices associated with the user; or
   one or more network user accounts to store the merchandise.

6. The system of claim 3, wherein the second additional information comprises:
   one or more shipping addresses associated with the first identifier; or
   one or more shipping methods associated with the first identifier for delivery of the merchandise.

7. The system of claim 1, wherein to process the request to purchase the merchandise, the at least one processor is further configured to execute the computer-executable instructions to:
   process a transaction to purchase the merchandise; and
   transmit instructions to send the merchandise.

8. The system of claim 1, wherein to process the request to purchase the merchandise, the at least one processor is further configured to execute the computer-executable instructions to:
  determine that the offer has not changed; and
  transmit instructions to send the merchandise.

9. The system of claim 1, wherein the at least one processor is further configured to execute the computer-executable instructions to:
  determine that the offer has changed;
  determine that the changed offer benefits a user associated with the user account;
  process a purchase transaction; and
  transmit instructions to send the merchandise.

10. The system of claim 9, wherein the changed offer is a decrease in price associated with the merchandise.

11. The system of claim 1, wherein the at least one processor is further configured to execute the computer-executable instructions to:
  determine that the offer has changed;
  determine that the changed offer does not benefit a user associated with the user account; and
  transmit a request for authorization to proceed with a purchase transaction.

12. The system of claim 11, wherein the changed offer is one or more of an increase in price associated with the merchandise, a suppression of the merchandise in a format for a device associated with the user, or unavailability of the merchandise.

13. The system of claim 1, wherein the electronic communication comprises an email, an in-text advertisement, a contextual advertisement, or text message.

14. A method, comprising:
  identifying a user device to send an electronic communication;
  generating, by a merchandise purchasing system comprising one or more computers, based at least in part on display capabilities of the user device, the electronic communication comprising an offer for a sale of merchandise;
  generating a token for a user and the user device based at least in part on an offer identifier associated with the offer and a first user identifier indicative of a recipient of the electronic communication;
  incorporating the token into the electronic communication;
  sending, by the merchandise purchasing system, over a communication network, the electronic communication to the user device, wherein the electronic communication causes the user device to present selectable indicia that enables selection of the offer;
  receiving, by the merchandise purchasing system, over a communication network, from the user device, a request to purchase the merchandise, wherein the request comprises the token, the offer identifier, the first user identifier, and data associated with the display capabilities of the user device;
  determining, by the merchandise purchasing system, based at least in part on the token, the offer identifier, the first user identifier, and the data associated with the display capabilities of the user device, that the offer was intended for an originator of the request and the user device;
  processing, by the merchandise purchasing system, a transaction to purchase the merchandise;
  sending, by the merchandise purchasing system, over the communication network to the user device, a confirmation of the processed transaction;
  receiving, by the merchandise purchasing system, over the communication network, location information for delivery of the merchandise based at least in part on the confirmation; and
  directing, by the merchandise purchasing system, a computer of the one or more computers to send the merchandise using at least the location information.

15. The method of claim 14, wherein the generating the token comprises:
  applying, by the merchandise purchasing system, a hash function to the offer identifier and the first user identifier, resulting in a hash value; and
  assigning, by the merchandise purchasing system, the hash value to the token.

16. The method of claim 15, wherein the determining that the offer was intended for the originator and the user device comprises:
  applying the hash function to the offer identifier and the first user identifier, resulting in a second hash value; and
  comparing the hash value with the second hash value; and
  determining that the hash value is equal to the second hash value.

17. At least one non-transitory computer-readable storage device having instructions encoded thereon that, in response to execution by a device, cause the device to perform operations comprising:
  identifying a user device to send an electronic communication;
  generating, based at least in part on display capabilities of the user device, the electronic communication comprising an offer for a sale of merchandise;
  generating a token for a user and the user device based at least in part on an offer identifier associated with the offer and a first identifier indicative of a recipient of the electronic communication;
  incorporating the token into the electronic communication;
  sending the electronic communication over a communication network to the user device, wherein the electronic communication causes the user device to present selectable indicia that enables selection of the offer;
  receiving a request to purchase the merchandise, wherein the request comprises the token, the offer identifier, the first identifier, and data associated with the display capabilities of the user device;
  determining, based at least in part on the token, the offer identifier, the first identifier, and the data, that the offer was intended for an originator of the request and the user device; and
  processing the request to purchase the merchandise.

18. The at least one non-transitory computer-readable storage device of claim 17, wherein determining that the offer was intended for the originator and the user device comprises:
  transmitting a request for first additional information; and
  receiving the first additional information, wherein processing the request comprises processing a transaction for a purchase of merchandise using at least the first additional information.

19. The at least one non-transitory computer-readable storage device of claim 17, the operations further comprising:
  processing a transaction to purchase the merchandise; and
  transmitting instructions to send the purchased merchandise.

20. The at least one non-transitory computer-readable storage device of claim 19, the operations further comprising:
- transmitting a confirmation of the processed transaction, wherein the confirmation comprises a request for information associated with delivery of the purchased merchandise; and
- receiving the information associated with delivery of the purchased merchandise,
- wherein transmitting the instructions to send the purchased merchandise comprises using at least the received information.

21. The at least one non-transitory computer-readable storage device of claim 20, the operations further comprising:
- receiving the merchandise from one or more merchandise providers; and
- transmitting additional instructions to send the merchandise.

22. The at least one non-transitory computer-readable storage device of claim 19, the operations further comprising:
- determining that the offer has changed; and
- determining that the changed offer benefits a user associated with a user account.

23. The at least one non-transitory computer-readable storage device of claim 22, wherein the changed offer comprises a decrease in price of the merchandise.

* * * * *